US012018390B2

(12) United States Patent
Olson et al.

(10) Patent No.: US 12,018,390 B2
(45) Date of Patent: Jun. 25, 2024

(54) ELECTROCHEMICAL URANIUM NITRIDE PRODUCTION

(71) Applicant: Westinghouse Electric Company LLC, Cranberry Township, PA (US)

(72) Inventors: Luke C. Olson, Columbia, SC (US); Kathryn E. Metzger, Columbia, SC (US); Edward J. Lahoda, Edgewood, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 303 days.

(21) Appl. No.: 17/753,548

(22) PCT Filed: Sep. 4, 2020

(86) PCT No.: PCT/US2020/049477
§ 371 (c)(1),
(2) Date: Mar. 7, 2022

(87) PCT Pub. No.: WO2021/050388
PCT Pub. Date: Mar. 18, 2021

(65) Prior Publication Data
US 2022/0333254 A1 Oct. 20, 2022

Related U.S. Application Data

(60) Provisional application No. 62/898,083, filed on Sep. 10, 2019.

(51) Int. Cl.
*C25B 1/01* (2021.01)
*C25B 1/50* (2021.01)
(Continued)

(52) U.S. Cl.
CPC .................. *C25B 1/01* (2021.01); *C25B 1/50* (2021.01); *C25B 9/09* (2021.01); *C25B 15/083* (2021.01); *G21C 3/62* (2013.01); *G21C 21/02* (2013.01)

(58) Field of Classification Search
None
See application file for complete search history.

(56) References Cited

U.S. PATENT DOCUMENTS

2014/0374272 A1* 12/2014 Garcia-Diaz ............. C25C 7/02
204/230.2

FOREIGN PATENT DOCUMENTS

CN 108109710 A 6/2018
FR 2750242 A1 12/1997
(Continued)

OTHER PUBLICATIONS

International Search Report and Written Opinion for International PCT Application No. PCT/US2020/049477, dated Feb. 22, 2021.

*Primary Examiner* — Brian W Cohen
(74) *Attorney, Agent, or Firm* — K&L Gates LLP

(57) ABSTRACT

A method is described herein that produces UN from $UF_6$ in at most two steps comprising $UF_6 \rightarrow$ intermediate $\rightarrow$ UN. The principle of the reaction is that in a first step, $UF_6$ would be reduced to $U_xN_y$, where x may be an integer selected from 1 and 3, and y is an integer selected from 1 and 2. Reduction occurs at or near the surface of a gaseous membrane electrode where it is also in contact with a nitrogen bearing salt. In a second step, $U_xN_y$ decomposes to UN and $N_2$ gas, either in the same reactor as the first step or after removal to a separate unit for further processing.

26 Claims, 4 Drawing Sheets

(51) Int. Cl.
*C25B 9/09* (2021.01)
*C25B 15/08* (2006.01)
*G21C 3/62* (2006.01)
*G21C 21/02* (2006.01)

(56) References Cited

FOREIGN PATENT DOCUMENTS

| | | |
|---|---|---|
| JP | H1164576 A | 3/1999 |
| WO | 2021050388 A1 | 3/2021 |

* cited by examiner

TABLE I

ELECTROMOTIVE FORCE IN EUTECTIC LiCl-KCl AT 450 °C

| Oxidation / Reduction Couple | $E°_M$ (Pt) (V) | $E°_m$ (Ag) (V) |
|---|---|---|
| U (III) / U (0) | -2.218 | -1.496 |
| U (IV) / U (0) | -1.950 | -1.230 |

FIG. 4

ELECTROCHEMICAL URANIUM NITRIDE PRODUCTION

CROSS-REFERENCE TO RELATED APPLICATIONS

This application is a U.S. National Stage Entry under 35 U.S.C. § 371 of International Patent Application No. PCT/US2020/049477, entitled ELECTROCHEMICAL URANIUM NITRIDE PRODUCTION, filed Sep. 4, 2020, which claims benefit under 35 U.S.C. § 119 (e) to 62/898,083, filed Sep. 10, 2019 entitled "ELECTROCHEMICAL URANIUM NITRIDE PRODUCTION," the contents of which are incorporated by reference herein.

STATEMENT REGARDING GOVERNMENT RIGHTS

This invention was made with government support under Contract No. NE-0008824 awarded by the Department of Energy. The U.S. Government has certain rights in this invention.

BACKGROUND OF THE INVENTION

1. Field of the Invention

The present application relates to a method for making fuels for nuclear reactors, and more particularly to a method for making uranium nitride.

2. Description of the Prior Art

Uranium nitride could be a good choice as an alternative to uranium dioxide as a fuel for use in nuclear reactors because it has a higher uranium density than uranium dioxide. The higher uranium density of uranium nitride allows for higher uranium-235 densities to be achieved in a fuel in comparison to similarly enriched uranium dioxide, thereby allowing for higher burnups (MWdays/kgU) for a given enrichment. Uranium nitride also has higher thermal conductivity and potential as an accident tolerant fuel due to its very low residual heat content during reactor operation which in some operational transients would prevent ballooning and bursting of fuel rods. Unfortunately, uranium nitride is difficult to manufacture, and the manufacturing processes are time consuming and complex, often involving multiple steps and high temperatures. The current method goes through the following production chain: $UF_6 \rightarrow UO_2 \rightarrow UC \rightarrow UN$.

SUMMARY OF THE INVENTION

The following summary is provided to facilitate an understanding of some of the innovative features unique to the embodiments disclosed and is not intended to be a full description. A full appreciation of the various aspects of the embodiments can be gained by taking the entire specification, claims, abstract and drawings as a whole.

A method for producing a uranium nitride fuel is described that includes exposing $UF_6$ gas to a nitrogen bearing salt at or near a cathode to reduce the hexavalent uranium fluoride. $U_xN_y$, where x is an integer of 1 or 2 and y is an integer of 1 to 3, is produced in the salt spontaneously, or at either the cathode or anode surface. In a second step, the $U_xN_y$ is converted to UN and nitrogen gas. Whether the $U_xN_y$ is produced in the salt or at one of the electrodes, depends on how the electrodes and salt solutions are managed. For example, if multiple three electrode set-ups were put in the salt, one electrode set could be tuned to produce a specific uranium fluoride product, and another set of electrodes could be tuned to produce a specific $U_xN_y$.

The method may be further described as including a reaction represented generally by steps:
(1) $xUF_6 + yN^{3-} \rightarrow U_xN_y + 6xF^-$ and
(2) $U_xN_y \rightarrow xUN + (y-x)/2 N_2$,
where x is an integer selected from 1 or 2, and y is an integer selected from 1 to 3. The method reduces the reaction for producing UN to at most two steps:
$UF_6 \rightarrow$ intermediate $\rightarrow$ UN. The $UF_6 \rightarrow$ intermediate reaction is carried out on a porous $UF_6$ membrane electrode in contact with a nitrogen bearing salt. The intermediate $\rightarrow$ UN reaction will occur at the same porous $UF_6$ membrane electrode or at the anode, or in the salt.

The source of the nitrogen may be an alkali or alkaline nitride salt, or a transition metal nitride salt. For example, the salts may be any one or a mixture of NaCN, KCN, NaCNO, KCNO, $K_2CO_3$, KCl, LiCl—KCl—$Li_3N$, and LiF—NaF—KF—$Li_3N$.

Alternatively or additionally, the source of the nitrogen may be by introduction of a nitrogen gas into the salt, which may be a neutral salt, or another solvent.

At least the first step of the method takes place in an electrochemical reaction chamber comprised of a cathode and an anode, each having an end that is immersed in a nitrogen bearing salt. $UF_6$ gas is introduced into the salt through the cathode and in certain aspects, nitrogen gas may be introduced into the salt through the anode. The salt itself may be a nitrogen salt.

The method may be carried out in a batch process or in a continuous process. The second step of the method may be carried out in the electrochemical reaction chamber or in a separate chamber, heated to a temperature higher than that of the electrochemical reaction chamber and high enough to decompose the $U_xN_y$ to UN.

BRIEF DESCRIPTION OF THE DRAWINGS

The characteristics and advantages of the present disclosure may be better understood by reference to the accompanying figures.

FIG. 4 is a Table showing the electromotive force for Uranium (III)/Uranium (0) and Uranium (IV)/Uranium (0) oxidation/reduction couples in eutectic LiCl—KCl at 450° C.

DESCRIPTION OF THE PREFERRED EMBODIMENTS

Figure 1:
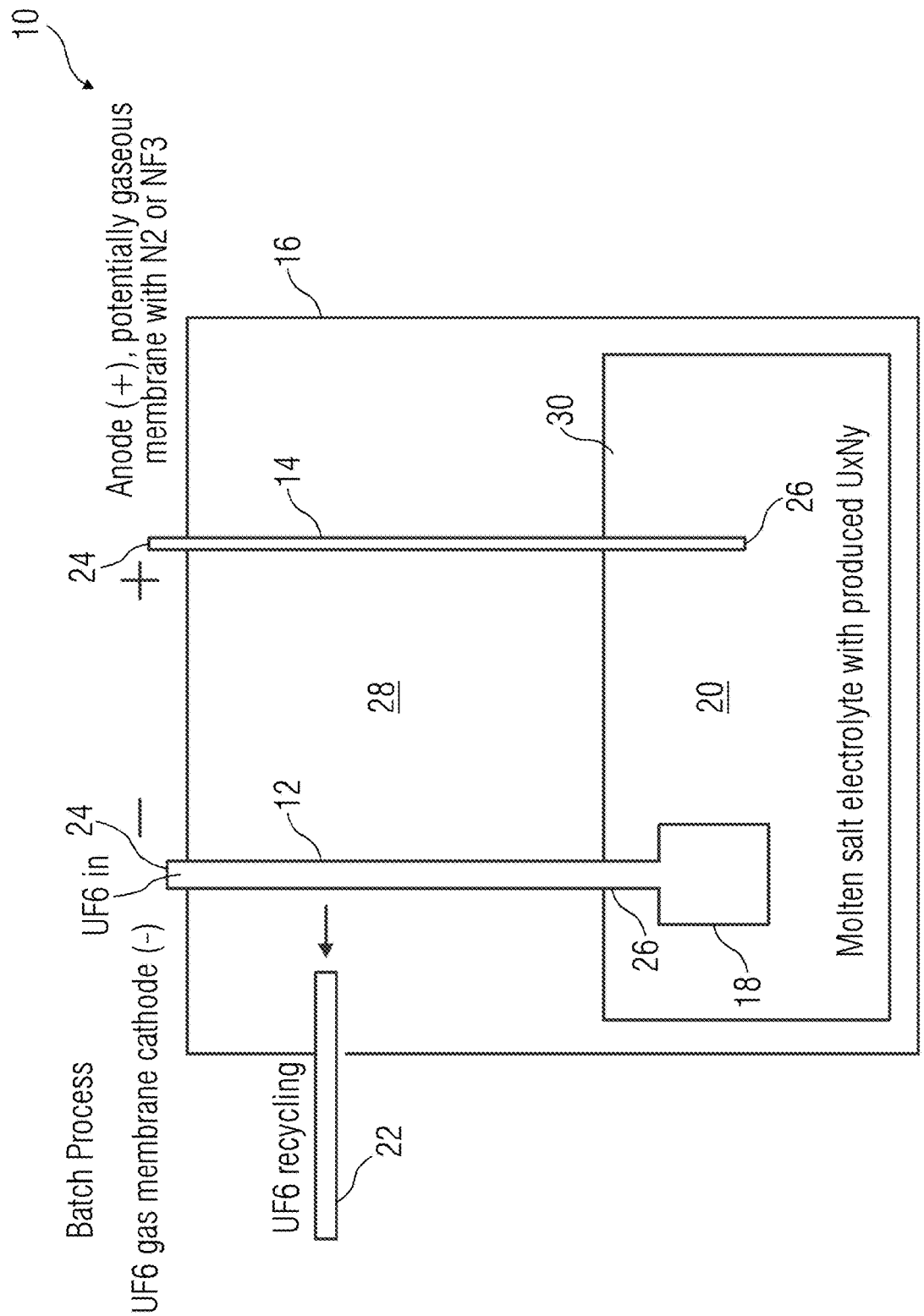
FIG. 1 is a schematic illustration of the features that may be used in an exemplary electrochemical reactor for a batch process of $U_xN_y$ production.

As used herein, the singular form of "a", "an", and "the" include the plural references unless the context clearly dictates otherwise.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

A method is described herein that produces UN from $UF_6$ in at most two steps comprising $UF_6 \rightarrow$ intermediate $\rightarrow$ UN. The principle of the reaction is that in a first step, $UF_6$ would be reduced to $U_xN_y$, where x may be an integer selected from 1 and 2, and y is an integer selected from 1, 2 and 3. Reduction occurs at or near the surface of a gaseous membrane electrode where it is also in contact with a nitrogen bearing salt. The $UF_6 \rightarrow$ intermediate reaction is carried out on a porous $UF_6$ membrane electrode in contact with a nitrogen bearing salt. A voltage is applied to the electrodes so that $UF_6$ is reduced to form $U_xN_y$. The intermediate$\rightarrow$UN reaction will occur at the same porous $UF_6$ membrane electrode or at the anode, or in the nitrogen bearing salt. In certain aspects, the nitrogen bearing salt may include, at least in the beginning of the reaction, small amounts of one or both of $UF_4$ and $UF_3$ sufficient to prime the reaction.

As used herein, "nitrogen bearing salt" shall mean (1) a salt that includes at least one nitrogen molecule bound (covalently or ionically) to at least one other molecule in the salt composition, such as NaCN, KCN, NaCNO, KCNO, or (2) a salt that is not bound (covalently or ionically) to the nitrogen but that includes unbound nitrogen molecules mixed with or dispersed within a quantity of salt, such as $N_2$. In certain aspects, at least in the beginning of the method, the nitrogen bearing salt may include small amounts of one or both of $UF_4$ and $UF_3$ sufficient to prime the reaction. The addition of $UF_4$, and $UF_3$ to the nitrogen bearing salt would be required in embodiments wherein two sets of electrodes are used in the salt, and the $U_xN_y$ production occurs at the anode of the second set, and the $UF_6$ to $UF_4$, $UF_3$, and/or U-metal reduction occur at another set.

In various aspects, $U_xN_y$ may be one or any combination of $UN_2$ (x=1 and y=2), $U_2N_3$ (x=2 and y=3), and UN (x and y both=1). In various aspects, the nitrogen used in the method described herein is at least 95% by mass $N^{15}$, which would be isolated prior to use in the method by isotopic separation from naturally occurring nitrogen gas, which is about 99.6% by mass $N^{14}$.

The source of the nitrogen may be an alkali or alkaline nitride salt, or a transition metal nitride salt. Alternatively or additionally, the source of the nitrogen may be by introduction of a nitrogen gas into the salt, which may be a neutral salt, or another solvent.

Exemplary alkali metals for use in the nitrogen bearing salt may be selected from Group 1 of the Periodic Table of the Elements, and include Li, Na, K, Rb, Cs, and Fr. Li, Na, and K are preferred. Exemplary transition metals for use in the nitrogen bearing salt may be selected from Groups 3-12 of the Periodic Table of the Elements. Many commercial nitride bearing salts are known, and available due to the use of liquid nitriding processes. For example, mixtures of NaCN, KCN, NaCNO, KCNO, $K_2CO_3$, KCl, etc. may be used. These mixtures normally have relatively low melting points and the current nitriding processes operate about 500-600° C. Other salt mixtures, such as LiCl—KCl—$Li_3N$ or LiF—NaF—KF—$Li_3N$ are also possible and would avoid the cyanides. LiCl—KCl, for example, melts about 352° C. FLiNaK melts about 454° C. The nitride component in the salt may be reconstituted through occasional nitride component additions, or through another porous electrode.

In a second step, $U_xN_y$ decomposes to UN and $N_2$ gas, either in the same reactor as the first step or after removal to a separate unit for further processing.

The method may be further described as including a reaction represented generally by steps:

(1) $xUF_6 + yN^{3-} \rightarrow U_xN_y + 6xF^-$ and (2) $U_xN_y \rightarrow xUN + (y-x)/2 N_2$, where x is an integer selected from 1 or 2, and y is an integer selected from 1 to 3.

At its simplest, the overall reaction would look like:

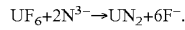
$UF_6 + 2N^{3-} \rightarrow UN_2 + 6F^-$.

Assuming, by way of example, that FLiNaK with $Li_3N$ is used as the nitrogen bearing salt, an exemplary overall reaction could look like:

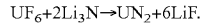
$UF_6 + 2Li_3N \rightarrow UN_2 + 6LiF$.

Similar reactions would occur with a wide variety of salts, and this disclosure is meant to cover any nitrogen bearing salt using a porous $UF_6$ membrane electrode.

Fluorides are thermodynamically stable, and hence it is not favorable to convert directly to a nitride from a fluoride. Also, in order for the exchange reaction to occur, it is possible that in reality the reaction that is occurring at the electrode/salt/$UF_6$ gas interface is far more complex, for example, first converting the $UF_6$ to lower states $U^{4+, 3+, 0}$, prior to the formation of a $U_xN_y$. For example, the conversion of $UF_6$ to UN directly, would at least require the change of state from $U^{6+} \rightarrow U^{3+}$, which would make the electrode reaction at the cathode to look like:

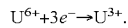
$U^{6+} + 3e^- \rightarrow U^{3+}$.

This would imply that at a minimum, the potential of a $UF_6$ gaseous membrane electrode must be held cathodic enough to induce the formation of $U^{3+}$ in the salt. However, in practice, boundary layers tend to form on the electrodes, so more than the theoretical minimum voltage would have to be applied to go over the boundary layers. Therefore, due to these normal required over potentials, the electrode may in various aspects need to be kept even more cathodic. In practice, the actual cathodic potential of the electrode could vary anywhere between the potential needed to induce the initial reduction of $UF_6$ (and negative enough so that a metallic membrane electrode should be galvanically protected) and not so cathodic that the main salt solvent constituents would plate out. The Table in FIG. 4 shows the electromotive force for $U^{3+}$ and $U^{4+}$ in eutectic LiCl—KCl salt for conversion to $U^0$. At least 2 volts or more would have to be applied under the stated conditions in the Table to get from $U^{4+}$ to $U^0$. Since the reactor would be converting $U^{6+}$ to the lower states $U^{4+, 3+, 0}$, the voltage needed would be much higher, such as 3 or more volts.

If the $UF_6$ is not directly converted to UN, it is desirable for the $U_xN_y$ conversion to UN occur in the salt, so as to keep the nitrogen chemically present in the salt, which should reduce complexity of systems needed to recapture enriched nitrogen-15, which is an expensive component. It may be possible to convert $UF_6$ to $UN_2$, which may require less over-potential, since the U remains in the 6+ state, although the $UN_2 \rightarrow UN$ conversion would still ideally occur in the same salt in the same electrochemical reactor. This can be done by raising the temperature above about 975° C. See, Silva G. W. et al., INORGANIC CHEMISTRY, *Reaction sequence and kinetics of uranium nitride decomposition*, Nov. 16, 2009; 48 (22):10635-42. doi: 10.1021/ic901165j.

Compared to other production methods, the process described herein would add simplification and reduction of unit operations to generate the UN from uranium hexafluoride feed. The ability to use uranium nitride over uranium oxide would allow for higher uranium-235 concentrations at lower enrichments, thereby allowing nuclear reactors to achieve higher burn-ups using current enrichment limits.

The methods currently employed to make UN take hours and multiple steps to employ. In various aspects, the method described herein can directly produce UN in a molten salt from $UF_6$. This process should make conserving enriched nitrogen-15 easier since it would stay chemically bound either as a UN or within the salt. This process could occur at relatively cool temperatures, for example, at ~400° C. for some salts or less than 600° C. for other salts. In addition, the process should minimize oxide contaminants in the product.

Referring to the Figures, exemplary electrochemical reactors 10, 100, and 200 are shown. FIG. 1 illustrates a reactor 10 in which a batch process for the production of $U_xN_y$ may occur. Reactor 10 includes a chamber 16 that contains a cathode 12, an anode 14, and a molten salt 20 held in a salt container 30 in the bottom portion of the chamber 16. Each of the cathode and the anode have a first end 24 that extends out of the top of the reactor chamber 16 and a second end 26 immersed in the molten salt 20. The second end 26 of cathode 12 terminates into a bubbler 18, also immersed in the salt 20. A gas exit conduit 22 opens into the space 28 above the salt 20 in chamber 16. One set of electrodes is shown in the Figures. However, in certain aspects, a second set of electrodes (not shown) may be used. In embodiments where two sets of electrodes are used in the salt, the $U_xN_y$ production occurs at the anode of the second set of electrodes, and the $UF_6$ to $UF_4$, $UF_3$, and/or U-metal reduction occur at the first set of electrodes.

In various aspects, cathode 12 may be in the form of a solid walled tube through which $UF_6$ gas flows from the first end 24 to the second end 26 into bubbler 18 to inject $UF_6$ into the molten salt 20. A suitable voltage is applied to the cathode by an electrical connection (not shown) from any suitable outside source and electricity flows between the cathode and the anode. If the salt is a nitride salt, the conversion of $UF_6$ to $U_xN_y$ occurs by reaction with the salt, typically at or near the cathode. Alternatively, the salt may be neutral or another type of solvent, and the source of nitrogen may enter the chamber 16 through the anode 14. Nitrogen gas, in the form of $N_2$, $NH_4$, or $NF_3$, may enter the first end 22 of the anode 14 and exit the second end 26 of the anode 14 into the salt 20, where, upon application of the appropriate voltage to the cathode 12, the nitrogen gas will react with the reduced $UF_6$ bubbled into the salt to produce $U_xN_y$. Alternatively, the $UF_6$ could be reduced at the cathode surface, and the generation of $U_xN_y$ could be made to occur at the anode surface 14 or in close proximity. Although only one source of nitrogen is necessary, nitrogen may enter the salt 20 from two sources. The nitrogen thus may be introduced into the reactor 10 from one or both of a nitride salt 20 or from a nitrogen gas injected through the anode 14.

Excess or un-reacted $UF_6$ that bubbles up through the salt 20 to the space 28 above the salt may be drawn through an exit conduit 22 for eventual re-use. In a typical recycling process, $UF_6$ gas may be withdrawn from the space 28 of chamber 16 and passed to a condenser. The condensate may then be vaporized to return $UF_6$ to its gaseous state and stored or recycled back through the cathode 12.

The $U_xN_y$ produced in reactor 10 may be separated from the salt 20 following the reaction by boiling off the salt which could, depending on the salt and its boiling point, also convert the $UN_2$ to $U_2N_3$ and then to UN if the boiling point exceeds 975° C. As stated above, the reaction in reactor 10 may directly produce UN. If, however, one or both of $UN_2$ and $U_2N_3$ is produced, the reaction product removed from the chamber 16 may be passed along to a second chamber or unit for further processing to produce UN. If separated, $UN_2$ and $U_2N_3$ may be heated to a temperature of about 975 to 1300° C. to decompose the $UN_2$ and/or $U_2N_3$ to UN. A temperature greater than 1700° C. may be used to vaporize any remaining salt, which may be recycled for return to the reactor.

Figure 2:
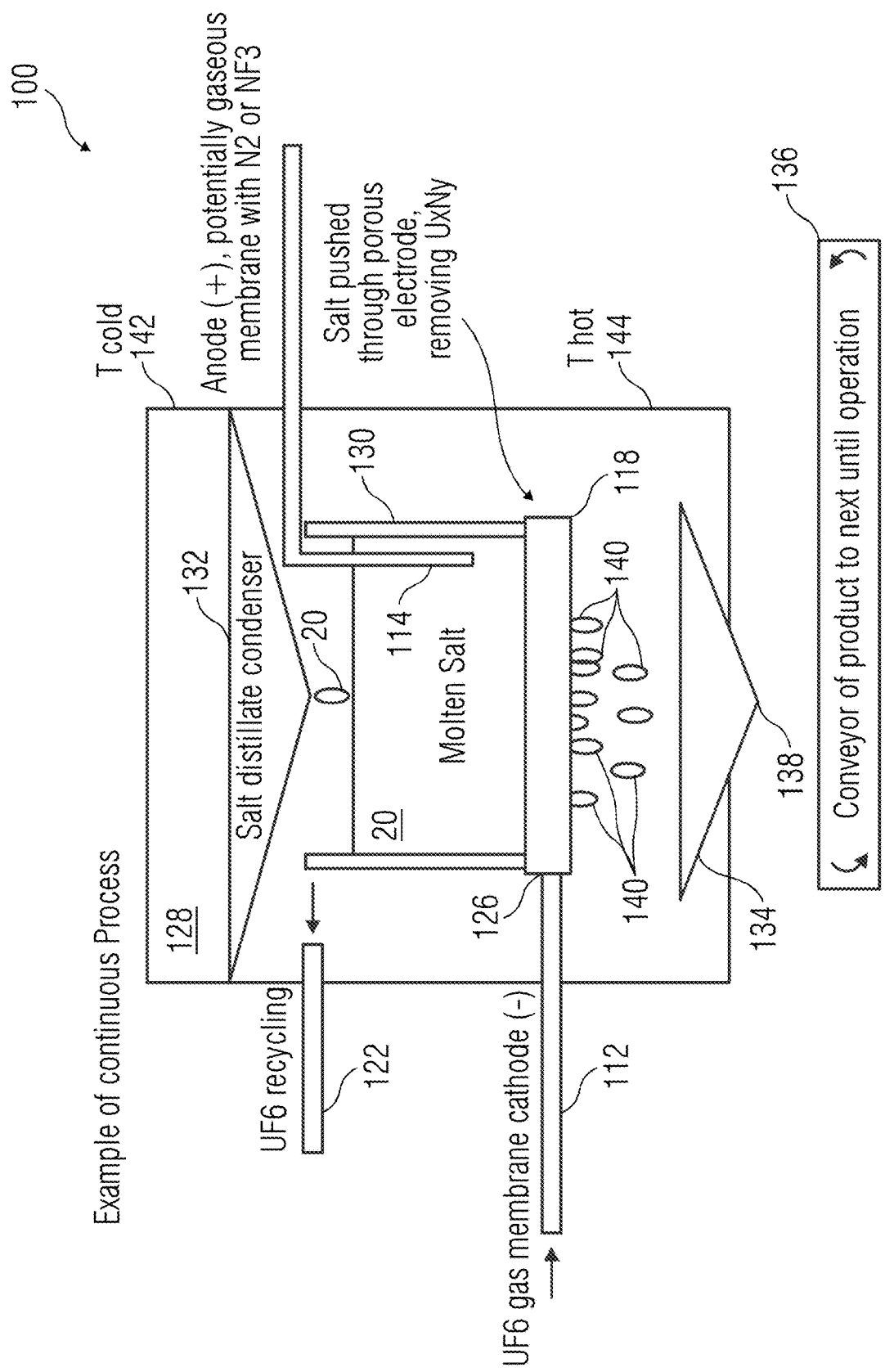
FIG. 2 is a schematic illustration of the features that may be used in an exemplary electrochemical reactor for a continuous process of $U_xN_y$ production.

Referring to FIG. 2, a continuous process for production of $U_xN_y$ may be carried out in electrochemical reactor 100. Reactor 100 includes a cathode 112, and anode 114, a chamber 116, a bubbler 118, a molten salt container 130, a salt distillate condenser 132, a separator member 134 and a conveyor 136. A recycling, or $UF_6$ gas exit conduit 122 to withdraw excess or unreacted $UF_6$ gas from the space 128 above the salt container 130 is also provided. A suitable voltage is applied to the cathode 112 by an electrical connection (not shown) from any suitable outside source and electricity flows between the cathode and the anode.

Chamber 116 has an upper portion 142 and a lower portion 144. Upper portion 142 is maintained at a temperature colder than that of lower portion 144. For example, in various aspects, depending on the salt used in the method, the upper portion 142 may be between 500-600° C., a temperature range that will allow the salt to flow through the distillate condenser but below the volatilization temperature for the salt. In other aspects, again depending on the salt used, the upper portion 142 may be between 300-400° C. The lower portion 144 of chamber 116 may, in various aspects, be held at about 1200° C. or more, but less than the melting point of UN (about 2500-2600° C.). At this temperature range, the salt will be distilled off and the UN will be a solid.

In reactor 100, $UF_6$ gas is introduced into the chamber 116 through the cathode 112. The interior end 126 of cathode 112 enters a bubbler 118 that is positioned along the bottom or floor of the salt container 130. Salt container 130 holds the molten salt 20, which, like the salt in reactor 10 may be the source of nitrogen, such as an alkali or transition metal nitride salt. Alternatively or additionally, the nitrogen may be introduced into the salt as a $N_2$ or $NF_3$ gas through the anode 114. The reaction converting $UF_6$ to $U_xN_y$ occurs at or near the cathode surface in the manner described above, producing one or more of $U_2N_3$, $UN_2$, and UN, which flow through the bubbler 118 into a member 134, such as a filter or sieve for separating the liquid salt from the solid $U_xN_y$. Differential pressure between the salt container and the membrane cathode force the $U_xN_y$ through the membrane into the separation member 134. The pressure may be applied by the head of the salt or by means of pressurizing the reactor vessel.

The temperature at the lower portion of the chamber 116 is maintained at greater than 1200° C. The salt will distill off at the higher temperature but the $U_xN_y$ will remain a solid. The salt distillate will rise to the upper portion 142 of chamber 116, where the temperature is colder and the salt distillate will be condensed to a liquid in distillate condenser 132 where it will be funneled back as molten salt 20 into salt container 130.

Separator member 134 may be a vibrating surface to break up solid pieces of $U_xN_y$ to smaller particles for ease of passage through for example, a filter or sieve. Member 134 may be heated to temperatures from greater than 1200 to 1700° C. or more to aid in distilling off the salt 20 and to convert any $U_2N_3$ and $UN_2$ present to UN and $N_2$ gas. At temperatures greater than 1700° C., pure UN may be produced. The solid $U_xN_y$ reaction products ($U_2N_3$, $UN_2$, and/or UN) are funneled or ramped off of separator member 134 to a conveyor system 136 for transport to further unit operations, if needed. The nitrogen gas produced would be $N^{15}$, which would be captured for reintroduction into the method, for example, as a nitrogen gas introduced through the anode 114.

Figure 3:
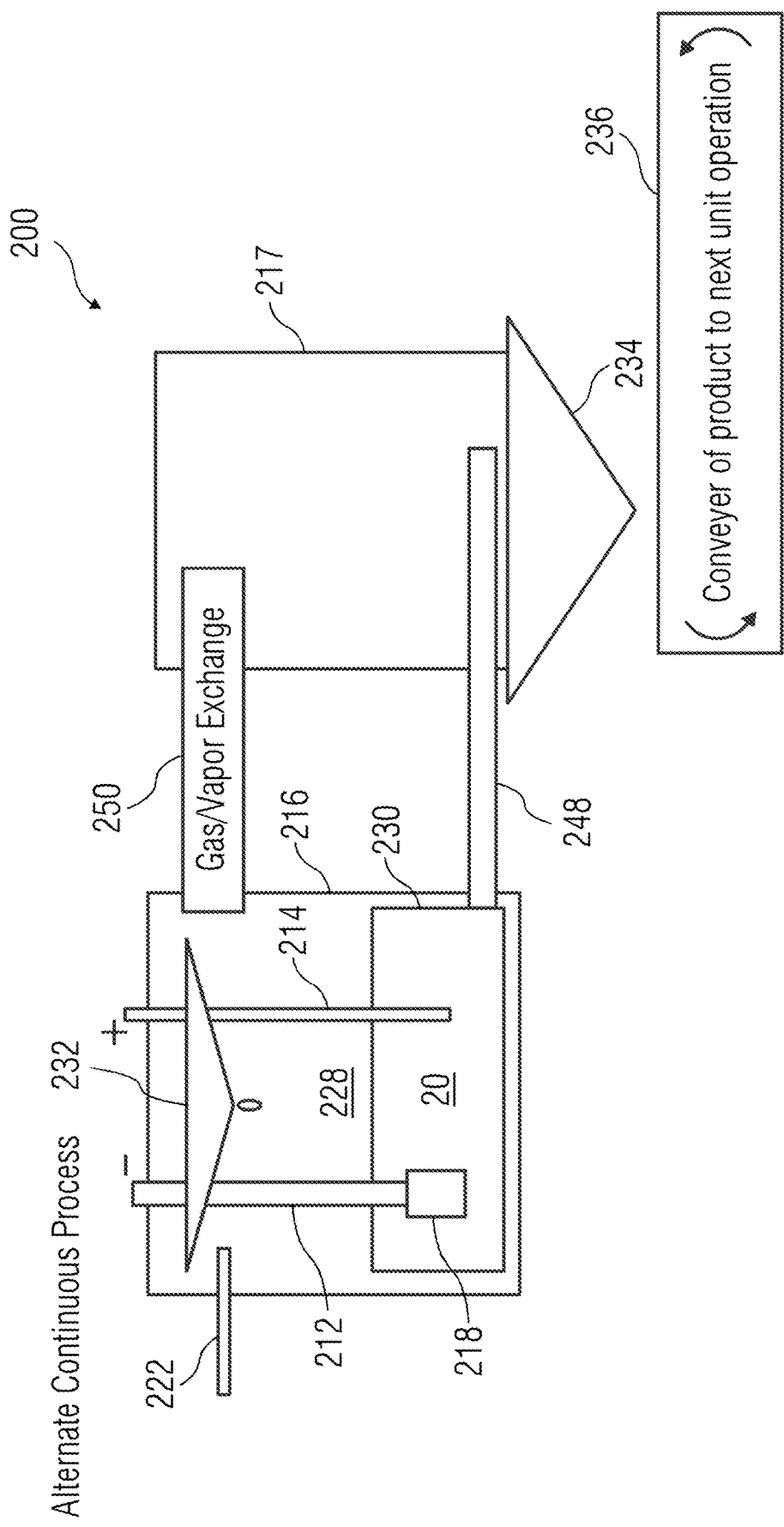
FIG. 3 is a schematic illustration of the features that may be used in an exemplary alternative electrochemical reactor for a continuous process of $U_xN_y$ production.

An alternative electrochemical reactor 200 for use in a method for either the batch or continuous production of UN is shown in FIG. 3. Reactor 200 includes two chambers 216 and 217. Chamber 216 includes a cathode 212 for introduction of $UF_6$ gas, an anode 214, a salt container 230, and a bubbler 218, each being similar to the cathode 12, anode 14, salt container 30, and bubbler 18 in reactor 10. Salt container 230 holds molten nitrogen containing salt, such as an alkali or transition metal salt described above, or may hold a neutral salt or other solvent when the source of nitrogen is a nitrogen gas introduced through anode 214. Like reactors 10 and 100, an exit conduit 222 is provided for withdrawing $UF_6$ gas for recycling. Chamber 216 of reactor 200 includes a salt distillate condenser 232 that functions in the same manner as the distillate condenser 132 in reactor 100. A suitable voltage is applied to the cathode 212 by an electrical connection (not shown) from any suitable outside source and electricity flows between the cathode and the anode.

Chamber 217 may be a separate chamber spaced from chamber 216 but connected to chamber 216 by two conduits 248 and 250. Alternatively, chambers 216 and 217 may be two adjacent sections of a single chamber fluidly connected by conduits 248 and 250. If the chambers 216 and 217 are adjacent sections of a single chamber, the sections would preferably be insulated to maintain the temperature differences between the two sections.

Chamber 216 is maintained at a colder temperature than chamber 217. For example, in various aspects, depending on the salt used in the method, chamber 216 may be between 500-600° C., a temperature range that will allow the salt to flow through the distillate condenser 232 but below the volatilization temperature for the salt. Chamber 217 may, in various aspects, be held at about 1200° C. or more, high enough to distill off the salt but less than the melting point of UN (about 2500-2600° C.).

Chamber 217 includes a separator member 234, similar to the member 134 in reactor 100. Conduit 248 transfers molten salt and $U_xN_y$ reaction products (e.g., $U_2N_3$, $UN_2$, and/or UN) from the salt container 230 in chamber 216 to the higher temperature chamber 217 where it empties onto separator member 234. Separator member 234, like member 134, may be a vibrating surface to break up solid pieces of $U_xN_y$ to smaller particles for ease of passage through for example, a filter or sieve. Member 234 may be heated to temperatures from greater than 1200 to 1700° C. or more to aid in distilling off the salt 20 and to convert any $U_2N_3$ and $UN_2$ present to UN and $N_2$ gas. The solid $U_xN_y$ reaction products ($U_2N_3$, $UN_2$, and/or UN) are funneled or ramped off of separator member 234 to the conveyor system 236 for transport to further unit operations, if needed. If all of the $U_2N_3$ and $UN_2$ is successfully converted to UN from the heated separator member 234 and/or heated chamber 217, the conveyor 236 transports the finished UN to, for example, a storage facility. The nitrogen gas produced in this step of the method would be $N^{15}$, which would be captured for reintroduction into the method, for example, as a nitrogen gas introduced through the anode 114.

The salt 20 that is distilled off of the separator member 234 in chamber 217 will rise to the upper portion of chamber 217 and pass through conduit 250 back to chamber 216, where the temperature is colder and the salt distillate will be condensed to a liquid in distillate condenser 232 where it will be funneled back as molten salt 20 into salt container 230.

Both $UF_6$ and the molten salts used in the reactors 10/100/200 are corrosive. Therefore, the cathodes 12/112/212 and the anodes 14/114/214 of reactors 10/100/200 would be made of a conductive, corrosion resistant material, such as a high Ni alloy, platinum, tungsten, or carbon. Those skilled in the art will appreciate that other corrosion resistant materials may be used as the electrodes in the electrochemical reactors 10/100/200 described herein.

While exemplary embodiments of electrochemical reactors in which the method described herein may be carried out have been described, those skilled in the art will recognize that modifications and additions to the basic components may be made. The features of any electrochemical reactor for the method include good gas/salt contact and a corrosion resistant cathode and anode. In addition, means for maintaining the temperature differences necessary for salt distillation and salt condensation at appropriate stages of the reaction, while maintaining the $U_xN_y$ reaction products in a solid state, and in various aspects, converting $U_xN_y$ intermediates to UN should be included. Due to the rarity and cost of reactants like $N^{15}$ and $UF_6$, recapture and recycling features are also desirable.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. A method for producing a uranium nitride fuel comprising:
   a reaction represented by steps:
   exposing $UF_6$ gas to a nitrogen bearing salt at or near a cathode to produce $U_xN_y$, where x is an integer of 1 or 2 and y is an integer of 1 to 3; and
   converting $U_xN_y$ to UN and nitrogen gas.

2. The method recited in claim 1 wherein the method is carried out in a batch process in a single reaction chamber.

3. The method recited in claim 1 wherein the method is carried out in a continuous process in a single reaction chamber.

4. The method recited in claim 1 wherein the method is carried out in a continuous process in two separate chambers.

5. The method recited in claim 1 wherein the nitrogen bearing salt is a nitride salt.

6. The method recited in claim 5 wherein the nitride salt is selected from the group consisting of alkali nitrides, alkaline nitrides, and transition metal nitrides.

7. The method recited in claim 5 wherein the method further comprises introducing nitrogen gas into the nitride salt.

8. The method recited in claim 5 wherein the nitrogen bearing salt is selected from the group consisting of NaCN, KCN, NaCNO, KCNO and mixtures thereof.

9. The method recited in claim 5 wherein the nitrogen bearing salt is selected from the group consisting of LiCl—KCl—$Li_3N$, LiF—NaF—KF—$Li_3N$ and mixtures thereof.

10. The method recited in claim 1 wherein the nitrogen bearing salt is produce by introducing nitrogen gas into a neutral salt or a solvent.

11. The method recited in claim 1 wherein the nitrogen is $N^{15}$.

12. The method recited in claim 1 further comprising reconstituting the nitrogen bearing salt by additions of nitrides to the salt.

13. The method recited in claim 1 wherein a voltage is applied to the cathode.

14. A method for producing a uranium nitride fuel comprising: a reaction represented by steps:
   (1) $xUF_6 + yN^{3-} \rightarrow U_xN_y + 6xF^-$ and
   (2) $U_xN_y \rightarrow xUN + (y-x)/2 N_2$;
   wherein x is an integer of 1 or 2 and y is an integer of 1 to 3; and
   the reaction being carried out on a porous UF6 membrane electrode of a first set of electrodes in contact with a nitrogen bearing salt.

15. The method recited in claim 14 wherein the nitrogen bearing salt is selected from the group consisting of alkali nitrides, alkaline nitrides, and transition metal nitrides.

16. The method recited in claim 14 wherein the nitrogen bearing salt includes one or both of $UF_4$ and $UF_3$ and step (2) takes place at an anode of a second set of electrodes in contact with the nitrogen bearing salt.

17. The method recited in claim 14 wherein the nitrogen bearing salt is selected from the group consisting of NaCN, KCN, NaCNO, KCNO and mixtures thereof.

18. The method recited in claim 14 wherein the nitrogen bearing salt is selected from the group consisting of LiCl—KCl—$Li_3N$, LiF—NaF—KF—$Li_3N$ and mixtures thereof.

19. The method recited in claim 18 wherein step (1) of the reaction is represented by;

$$UF_6 + 2Li_3N \rightarrow UN_2 + 6LiF.$$

20. The method recited in claim 14 carried out at temperatures between 350 and 600° C.

21. The method recited in claim 14 further comprising:
   reconstituting the reaction by nitride component additions.

22. The method recited in claim 14 further comprising:
   reconstituting the reaction by replacing the porous $UF_6$ membrane electrode of the first set of electrodes or adding a second set of electrodes having a second porous $UF_6$ membrane electrode.

23. The method recited in claim 14 further comprising:
   separating the $U_xN_y$ from the salt by distilling the salt at a temperature sufficient for volatilizing the salt but maintaining the $U_xN_y$ as a solid.

24. The method recited in claim 23 further comprising:
   heating the solid $U_xN_y$ to a temperature between 975° C. to less than 2500° C. to convert $U_xN_y$ to UN.

25. The method recited in claim 23 further comprising:
   condensing the distilled salt;
   adding the condensed salt to the nitrogen bearing salt; and,
   adding nitrides to the condensed salt.

26. The method recited in claim 23 wherein the temperature for volatilizing the salt is about 1200° C.

* * * * *